United States Patent [19]
Chipper

[11] Patent Number: 5,493,441
[45] Date of Patent: Feb. 20, 1996

[54] INFRARED CONTINUOUS ZOOM TELESCOPE USING DIFFRACTIVE OPTICS

[75] Inventor: Robert B. Chipper, Dallas, Tex.

[73] Assignee: Texas Instruments Incorporated, Dallas, Tex.

[21] Appl. No.: 181,263

[22] Filed: Jan. 13, 1994

[51] Int. Cl.⁶ .......................... G02B 15/14; G02B 13/14; G02B 27/44
[52] U.S. Cl. .......................... 359/354; 359/357; 359/565
[58] Field of Search .................... 359/354, 355, 359/356, 357, 565, 566, 567

[56] References Cited

U.S. PATENT DOCUMENTS

| | | | |
|---|---|---|---|
| 3,947,084 | 3/1976 | Noyes | 359/354 |
| 4,411,488 | 10/1983 | Neil | 359/354 |
| 4,479,695 | 10/1984 | Neil | 359/354 |
| 4,936,666 | 6/1990 | Futhey | 359/566 |
| 5,044,706 | 9/1991 | Chen | 359/357 |
| 5,073,007 | 12/1991 | Kedmi et al. | 359/565 |
| 5,151,823 | 9/1992 | Chen | 359/566 |
| 5,268,790 | 12/1993 | Chen | 359/565 |

OTHER PUBLICATIONS

"Infrared Zoom Lenses in The 1980s and Beyond", Allen Mann, Optical Engineering, vol. 31. No. 5, May, 1992 pp. 1064–1071.

"Binary Optics", Veldkamp et al., Scientific American, May, 1992, pp. 92–97.

"Diffractive Optical Elements For Use In Infrared Systems" Swanson et al., Optical Engineering vol. 28. No. 6, Jun., 1989, pp. 605–608.

*Primary Examiner*—Paul M. Dzierzynski
*Assistant Examiner*—Audrey Chiang
*Attorney, Agent, or Firm*—Rene' E. Grossman; Richard L. Donaldson

[57] ABSTRACT

An infrared continuous zoom telescope or afocal lens system using a diffractive surface for color correction. The lens system comprises an objective lens, an eyepiece lens, a plurality of lenses disposed between the objective lens and the eyepiece lens to provide the zoom function and a diffractive pattern disposed at a surface, preferably the interior surface and preferably integral therewith, of the objective lens to provide color correction at a predetermined wavelength of light passing through the objective lens. All of the lenses are preferably germanium. The diffractive pattern comprises a plurality of spaced ring-shaped steps, each ring concentric with the center of the objective lens and each step having a height equal to the predetermined wavelength for which the lens system is designed. The plurality of ring-shaped steps are formed in accordance with a known formula.

18 Claims, 1 Drawing Sheet

INFRARED CONTINUOUS ZOOM TELESCOPE USING DIFFRACTIVE OPTICS

BACKGROUND OF THE INVENTION

1. Field of the Invention

This invention relates to an infrared continuous zoom telescope or lens system and, more specifically, to the use of a diffractive surface to color correct an infrared continuous zoom afocal lens.

2. Brief Description of the Prior Art

It is known that different frequencies of light do not focus at the same location after passing through a lens system. For this reason, color correction has been built into prior art lens systems. The state of the art of infrared zoom lenses is set forth in an article of Allen Mann entitled "Infrared zoom lenses in the 1980s and beyond", *Optical Engineering,* May, 1992, Vol. 31, No. 5, pp. 1064–1071 and in a brochure of Lenzar ElectroOptics, Inc. entitled "Infrared 8:1 Zoom With Advanced Optical Technology". The Mann article generally describes two telescopes, the Pilkington telescope utilizing "Zulu" techniques for compactness and the Barr & Stroud zoom telescope. Both telescopes require an additional zinc selenide negative lens for color correction and require at least nine optical elements. The zinc selenide lens increases the cost, weight and complexity of the lens system. The Lenzar system uses diffractive aspheric optics in a zoom system in the 3 to 5 micron range but provides no structural details.

SUMMARY OF THE INVENTION

In accordance with the present invention, there is provided an infrared continuous zoom telescope or lens system utilizing a diffractive optical surface in the 8 to 12 micron infrared range for color correction. The system includes a continuous zoom objective lens and a fixed focal length eyepiece. The lens system includes five singlet elements, the first singlet element being a fixed primary objective lens followed by two negative zoom elements. The fourth element is a stationary collecting lens and the fifth element is the eyepiece. To insure good color correction, a diffractive optical surface modelled on Code V, which is designed as a holographic optical pattern, is provided on the interior surface of the first lens element in place of the introduction of an extra element, generally a negative zinc selenide element, as in the prior art.

As stated in "Optical design with diffractive lenses", *Sinclair Optics Design Notes,* Dale A. Buralli, Vol. 2, No. 4, Fall, 1991, in general, the term diffractive optics or diffractive optical elements refers to those optical elements that base their operation on the utilization of the wave nature of light. This broad categorization can be divided into several subsections. Diffractive lenses are elements that perform functions similar to conventional refractive lenses, e.g., they form an image. Kinoforms are diffractive elements whose phase modulation is introduced by a surface relief pattern. Binary optics are kinoforms produced by photolithographic techniques, resulting in a "stair-step" approximation to the desired profile.

Each photolithography step increases the number of levels in the surface by a factor of two, hence the term binary optics. Holographic optical elements are devices formed by recording the interference pattern of two or more waves.

Holographic optical elements have been studied since the early 1950s when Gabor realized that a hologram of a lens would act like the lens itself. A number of problems have prevented holographic lenses from becoming widespread. Diffraction efficiency, difficulty in fabrication, and the highly dispersive nature of the hologram itself all contributed to these problems. Gradually, design tools were developed, such as the HOE option in CODE V, the optical design software used in conjunction with the subject application. Kinoforms were identified as highly efficient diffractive elements. A kinoform is a stepped lens whose surface is cut back by precisely one wavelength of light every time its thickness increases by that amount. Recently, Veldkamp has used photolithography to approximate the kinoform surface profile. More recently, diamond point turning (DPT) has been proposed to create the proper kinoform surface, bypassing the binary approximation.

It has further been proposed to use the dispersive nature of the diffractive elements for color correction. Without this approach, diffractive optics would be limited to monochromatic or other very specialized applications. Diffractive optical elements are highly dispersive in that they break up white light into its component colors from red at one end of the spectrum to blue at the other end. This dispersion is opposite in sign to that of most glasses and will cancel that of most conventional lenses. Therefore, over a small wavelength band, by combining conventional optics with diffractive optics, the chromatic aberration resulting from the dispersive characteristic of the glass can be reduced.

The diffractive surface is a kinoform produced by diamond point turning, patterned and etched or the like. Kinoforms are diffractive elements whose phase modulation is introduced by a surface relief pattern. The diffractive optical surface results in a step function whose surface is cut back by precisely one wavelength of the light frequency of interest, preferably 10 microns for operation in the 8 to 12 micron range, every time their thickness increases by that amount. The pattern required to yield the holographic element is provided by adding an additional term to the aspheric equation which provides a phase shift thereto.

The diffractive surface allows the lens to be made using all germanium elements, germanium being a very low dispersive material in the 8 to 12 micron wavelength region of the light spectrum. Furthermore, germanium is selected for all of the lens elements because of its high refractive index which is essential when minimizing lens aberrations. The lens count is reduced to five through the use of aspheric surfaces which reduces the overall physical length as well.

The kinoform diffractive surface is an optical surface whose phase modulation is introduced through the use of a surface relief pattern machined into the glass using a diamond tipped tool just as a general aspheric surface would be cut using the DPT process, but the diffractive surface profile follows a slightly different equation which includes a phase or surface relief term. The equation for the diffractive kinoform surface is:

$$Z = \frac{(CC)Y^2}{(1 + [1 - (1+K)(CC)^2 Y^2]^{1/2})} + AY^4 + BY^6 +$$

$$CY^8 + DY^{10} + (HOR)\left\{ \frac{C1Y^2 + C2Y^4 + C3Y^6}{(N1 - N2)} - \frac{\lambda}{(N1-N2)} + INT \frac{[C1)Y^2 + C2Y^4 + C3Y^6]}{\lambda} \right\}$$

where:

$Z$ is Sag value along the z-axis or optical axis $Y$ is the semi-diameter height $CC$ is the base curvature (1/radius) of the surface K is the conic coefficient of the surface A, B, C and D are the 4th, 6th, 8th and 10th order aspheric coefficients, respectively HOR is the diffraction order, generally 1 or −1

$\lambda$ is the design wavelength for the surface

N1 is the refractive index of the material preceding the diffractive surface

N2 is the refractive index of the material following the diffractive surface

C1, C2 and C3 are coefficients for describing aspheric phase departure.

INT is an integer function.

$N_1$ is the index of refraction preceding the diffractive surface $N_2$ is the index of refraction following the diffractive surface.

The $\lambda/(N_1-N_2)$ term is the step height. This step is repeated at the semi-diameters wherein INT $[((C1)Y^2+(C2)Y^4+(C3)Y^6)/\lambda]$ returns an integer value. In other words, where $C1Y^2$ is an integer multiple of one wavelength if C2 and C3 are zero.

Binary kinoforms are diffractive surfaces with a surface relief pattern etched onto the glass using photolithographic techniques, resulting in a "stair-step" approximation to the desired profile. Techniques that produce present state of the art integrated circuits can reproduce these surfaces inexpensively and in high volume. The diffraction optical efficiency, the amount of light redirected in the desired direction, can be increased by increasing the number of masks used to etch the desired surface, hence more closely approximating the desired phase modulated surface.

Unique features of the invention are the use of a diffractive surface to color correct an infrared continuous zoom afocal lens system which allows the lens to be made of all germanium and be of simple construction, requiring only five singlet lens elements.

DESCRIPTION OF THE PREFERRED EMBODIMENT

Figure 1:
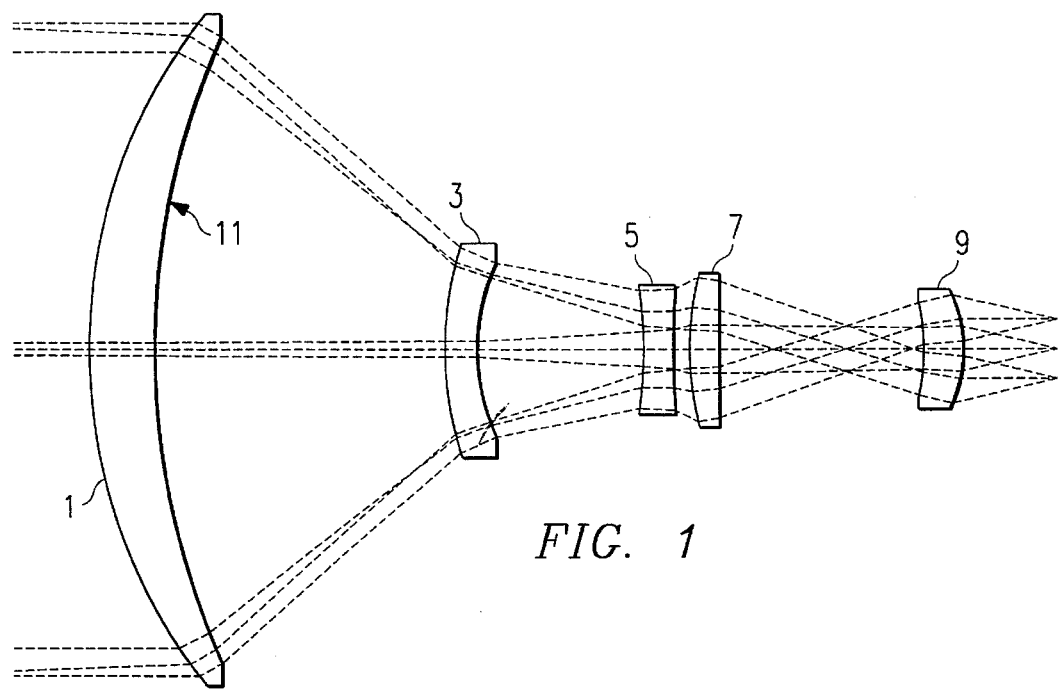
FIG. 1 is a schematic diagram of a continuous zoom lens system or telescope in accordance with the present invention.

Referring now to FIG. 1, there is shown a continuous zoom lens system in accordance with the present invention. The system includes a plurality of lenses, all fabricated of germanium.

The objective lens 1 is aspheric having a spherical front surface and an aspheric diffractive interior surface and is stationary. The second lens 3 is also an aspheric lens having a spherical interior surface and an aspheric front surface. The third lens 5 is also an aspheric lens having a spherical front surface and an aspheric interior surface. The fourth lens 7 is an aspheric lens having a spherical front surface and an aspheric interior surface. The fifth lens 9 is an aspheric lens having a spherical interior surface. The second lens 3 and third lens 5 each move independently to create the zoom feature as is well known in the art. The fourth lens 7 is a collecting lens and is stationary and the fifth lens 9 is the eyepiece lens and is stationary.

Diffractive optical elements are highly dispersive, that is to say, they break white light into its components colors from red at one end of the spectrum to blue at the other end. This dispersion is opposite in sign to that of most glasses. Therefore, the high dispersive characteristic of the diffractive surface is used to cancel the dispersive characteristic of germanium.

To provide the color correction, a diffractive surface was used on lens 1. The interior or rear surface 11 of the objective lens 1 is modified by changing the thickness of the material relative to the aperture or amount of the lens being used in order to bring the different wavelengths of light to a common focus at the image plane. This phase modulation is introduced by a surface relief pattern resulting in a step function on lens surface 11. The steps are provided in accordance with the equation set forth hereinabove which provides the step height and the distance out from the center of the aperture for placement of each step. The steps are circular or rings and the distance between adjacent rings will diminish with increased distance out from the center as can be seen from the above equation.

Figures 2, 3A, 3B:
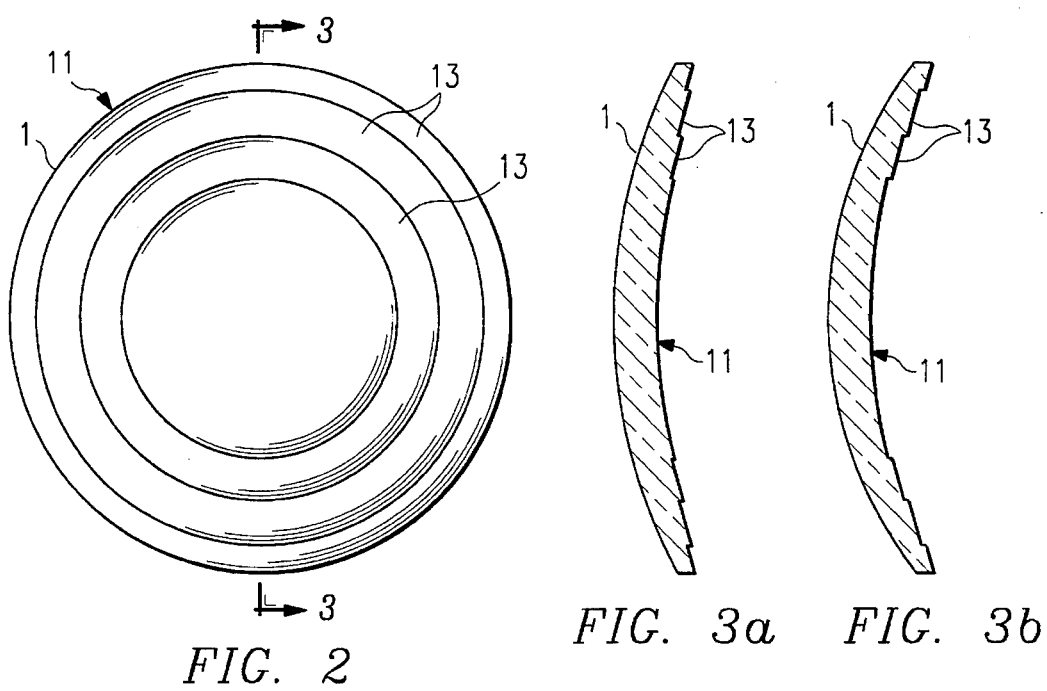
FIG. 2 is a top view of the interior or rear surface of the objective lens of the lens system of FIG. 1 in accordance with the present invention.
FIGS. 3a and 3b are cross-sectional views along the lines 3—3 of FIG. 2, FIG. 3a showing the steps moving out from the lens interior in a direction toward the lens center and FIG. 3b showing the steps moving out from the lens interior in a direction toward the lens edge.

Referring now to FIGS. 2, 3a and 3b there is shown the interior surface 11 of the lens 1 with the diffractive surface formed thereon. The surface 11 includes a plurality of rings or circular steps 13, each of the rings having a step function. The steps can move out from the lens interior either in a direction toward the lens center as shown in FIG. 3a or toward the lens edge as shown in FIG. 3b, each case being for a concave lens. The arrangement of FIG. 3a is preferred.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A color correcting lens system comprising:
   (a) a zoom afocal lens system including:
      (i) an objective lens;
      (ii) an eyepiece lens;
      (iii) a plurality of lenses disposed between said objective lens and said eyepiece lens; and
      (iv) a diffractive pattern disposed at a surface of said objective lens to provide color correction at a predetermined wavelength of light passing therethrough;
   (b) all of said lenses of said system being germanium lenses.

2. The lens system of claim 1 wherein said pattern is disposed on the interior surface of said objective lens.

3. The lens system of claim 2 wherein said plurality of lenses consists of three lenses, two of said three lenses providing said zoom function.

4. The lens system of claim 3 wherein said diffractive pattern is integral with said objective lens.

5. The lens system of claim 4 wherein said diffractive pattern comprises a plurality of spaced ring-shaped steps, each ring concentric with the center of said objective lens and each step having a height equal to said predetermined wavelength.

6. The lens system of claim 3 wherein said diffractive pattern comprises a plurality of spaced ring-shaped steps, each ring concentric with the center of said objective lens and each step having a height equal to said predetermined wavelength.

7. The lens system of claim 2 wherein said diffractive pattern comprises a plurality of spaced ring-shaped steps, each ring concentric with the center of said objective lens and each step having a height equal to said predetermined wavelength.

8. The lens system of claim 1 wherein said plurality of lenses consists of three lenses, two of said three lenses providing said zoom function.

9. The lens system of claim 8 wherein said diffractive pattern comprises a plurality of spaced ring-shaped steps, each ring concentric with the center of said objective lens and each step having a height equal to said predetermined wavelength.

10. The lens system of claim 1 wherein said diffractive pattern is integral with said objective lens.

11. The lens system of claim 10 wherein said diffractive pattern comprises a plurality of spaced ring-shaped steps, each ring concentric with the center of said objective lens and each step having a height equal to said predetermined wavelength.

12. The lens system of claim 1 wherein said diffractive pattern comprises a plurality of spaced ring-shaped steps, each ring concentric with the center of said objective lens and each step having a height equal to said predetermined wavelength.

13. A color correcting lens system comprising:
   (a) a zoom afocal lens system including:
      (i) an objective lens;
      (ii) an eyepiece lens;
      (iii) a plurality of lenses disposed between said objective lens and said eyepiece lens; and
      (iv) a diffractive pattern disposed at a surface of said objective lens to provide color correction at a predetermined wavelength of light passing therethrough, said diffractive pattern comprising a plurality of spaced ring-shaped steps, each ring concentric with the center of said objective lens and each step having a height equal to said predetermined wavelength said plurality of ring-shaped steps being formed in accordance with the formula $$Z = \frac{(CC) Y^2}{(1 + [1 - (1+K)(CC)^2 Y^2]^{1/2})} + AY^4 + BY^6 +$$

$$CY^8 + DY^{10} + (HOR) \left\{ \frac{C1Y^2 + C2Y^4 + C3Y^6)}{(N1 - N2)} - \frac{\lambda}{(N1 - N2)} + INT \frac{[C1)Y^2 + C2Y^4 + C3Y^6]}{\lambda} \right\}$$

where:

Z is Sag value along the z-axis or optical axis

Y is the semi-diameter height

CC is the base curvature (i/radius) of the surface

K is the conic coefficient of the surface

A, B, C and D are the 4th, 6th, 8th and 10th order aspheric coefficients, respectively HOR is the diffraction order, generally 1 or −1

$\lambda$ is the design wavelength for the surface

N1 is the refractive index of the material preceding the diffractive surface

N2 is the refractive index of the material following the diffractive surface

C1, C2 and C3 are coefficients for describing aspheric phase departure

INT is an integer function;

(b) all of said lenses of said system being germanium lenses.

14. The lens system of claim 13 wherein said pattern is disposed on the interior surface of said objective lens.

15. The lens system of claim 14 wherein said diffractive pattern is integral with said objective lens.

16. The lens system of claim 13 wherein said diffractive pattern is integral with said objective lens.

17. A color correcting objective lens comprising:
   (a) a germanium objective lens; and
   (d) a diffractive pattern disposed at a surface of said objective lens to provide color correction at a predetermined wavelength of light passing therethrough, said diffractive pattern comprising a plurality of spaced ring-shaped steps, each ring concentric with the center of said objective lens and each step having a height equal to said predetermined wavelength, said plurality of ring-shaped steps being formed in accordance with the formula $$Z = \frac{(CC) Y^2}{(1 + [1 - (1+K)(CC)^2 Y^2]^{1/2})} + AY^4 + BY^6 +$$

$$CY^8 + DY^{10} + (HOR) \left\{ \frac{C1Y^2 + C2Y^4 + C3Y^6)}{(N1 - N2)} - \frac{\lambda}{(N1 - N2)} + INT \frac{[C1)Y^2 + C2Y^4 + C3Y^6]}{\lambda} \right\}$$

where:

Z is Sag value along the z-axis or optical axis

Y is the semi-diameter height

CC is the base curvature (i/radius) of the surface

K is the conic coefficient of the surface

A, B, C and D are the 4th, 6th, 8th and 10th order aspheric coefficients, respectively HOR is the diffraction order, generally 1 or −1

$\lambda$ is the design wavelength for the surface

N1 is the refractive index of the material preceding the diffractive surface

N2 is the refractive index of the material following the diffractive surface

C1, C2 and C3 are coefficients for describing aspheric phase departure

INT is an integer function.

18. The lens of claim 17 wherein said diffractive pattern is integral with said objective lens.

* * * * *